Patented Oct. 18, 1949

2,485,265

UNITED STATES PATENT OFFICE 2,485,265

PROCESS FOR THE SEPARATION OF TRIISOBUTYLENE ISOMERS

Lawrence T. Eby, Roselle, N. J., assignor to Standard Oil Development Company, a corporation of Delaware No Drawing. Application May 31, 1946,
Serial No. 673,603

15 Claims. (Cl. 260—677)

This invention relates to a method for separating the distillable isomers of polymerized isobutylene in which more than two molecules of isobutylene have been polymerized by a reaction with hydrogen chloride.

Triisobutylene is prepared by the polymerization of three molecules of isobutylene and the triisobutylene formed consists of two isomers having a double bond at the end of the molecule, i. e. terminally located, and two isomers having the double bond in the center of the molecule, i. e. centrally located. The four isomers of triisobutylene heretofore have been partially separated by very careful precisional fractional distillation (Whitmore et al., J. Am. Chem. Soc., 63, 2035–41 (1941)). The isomers have boiling points differing only slightly, and therefore, the separation by fractional distillation is tedious and requires special distillation equipment. The following formulae probably represents the four isomers of triisobutylene:

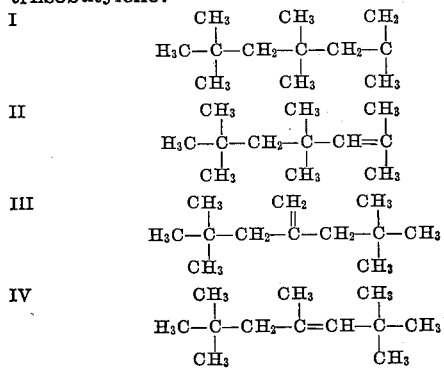

Isomers I and II have double bonds attached to the second carbon atom in the longest chain. Isomers III and IV have double bonds attached to the fourth carbon atom in the longest chain.

These components of triisobutylene were separated into three groups by superfractionation by Whitmore et al. (loc. cit.) with the following physical constants:

| Groups | A | B | C |
|---|---|---|---|
| Percent of Total Trimer | 75 | 15 | 10 |
| Cottrell B. P., °C./760 mm | 177.7 | 179.0 | 183–5 |
| $N_D^{20}$ | 1.4300 | 1.4318 | 1.4415 |

Group A is said to consist mainly of III and the low boiling geometric isomer of IV, group B consists mainly of the higher boiling isomer of IV and a smaller amount of III and group C consists mainly of I and II. The low boiling isomers therefore consist of III and IV while the high boiling isomers consist of I and II.

It has been known that hydrogen chloride adds to a double bond to form hydrochlorides but this reaction has not been used to separate a mixture of isomeric triisobutylenes. Hydrogen chloride adds readily and completely to all the isomers of diisobutylene. It has now been found that hydrogen chloride reacts with only part of the isomers of triisobutylene.

This invention has for an object the separation of isomeric triisobutylenes having a double bond attached to the second carbon atom in the longest chain as represented by Formulae I and II which are more reactive to hydrogen chloride and have higher boiling points, from isomeric triisobutylenes having a double bond attached to the fourth carbon atom in the longest chain as represented by Formulae III and IV which are less reactive to hydrogen chloride and have lower boiling points.

Another object of this invention is the separation of the isomers of triisobutylene by the formation of hydrochlorides of the isomers having a double bond attached to the second carbon atom in the longest chain and separation of the isomers having a double bond attached to the fourth carbon atom in the longest chain from the hydrochlorides formed.

Still another object of this invention is the separation of the isomers of triisobutylene by a simple and efficient process.

Another and further object of this invention is the separation of the distillable isomers of polymerized isobutylene formed by the polymerization of more than two molecules of isobutylene.

It has now been discovered that the high boiling isomers of triisobutylene react with hydrogen chloride whereas the low boiling isomers do not readily react with hydrogen chloride. It has also been discovered that an efficient and simple separation of the isomers of triisobutylene may be made by reacting a mixture of the isomers with hydrogen chloride and distilling from the reaction mixture the unreacted isomers. The triisobutylene hydrochlorides remaining undistilled are decomposed upon heating at atmospheric pressure. The isomers which react with hydrogen chloride are thus recovered free from the isomers which do not react with hydrogen chloride. A probable explanation of the reason that the isomers of triisobutylene having a double bond attached to the fourth carbon atom in the longest chain do not react with hydrogen chloride is on the basis of the phenomenon of steric hindrance.

Polymers of isobutylene resulting from the polymerization of four, five and more molecules of isobutylene are known and these all are mixtures of isomers in which some of the isomers are reactive to hydrogen chloride and others are not. The reactive and unreactive isomers can be separated by the process described in this invention.

This invention is practiced in the preferred manner by adding dry hydrogen chloride to a mixture of the isomers of triisobutylene until no more hydrogen chloride is absorbed. The temperature of the reaction is substantially within the range of from 0° C. to 50° C. although temperatures below 0° C. may also be used. The reaction may be carried out in a closed system or in a system which is open to the air. The time of the reaction varies with the amount of triisobutylene, temperature, and pressure of hydrogen chloride involved, but a few minutes to a few hours are ordinarily sufficient for the conversion of the isomers to the corresponding hydrochlorides. The preferred procedure for the reaction is to add the hydrogen chloride to the triisobutylene at atmospheric pressure. After the maximum amount of hydrogen chloride has been absorbed by the triisobutylene any excess hydrogen chloride is removed by passing a dry inert gas such as air, nitrogen or carbon dioxide through the reaction mixture. Any traces of hydrogen chloride may be removed by the introduction into the reaction mixture of a suitable base which will react with the excess hydrogen chloride. Examples of suitable bases are: Sodium and potassium carbonates and bicarbonates. The reaction mixture is shaken with the base and decanted. The reaction mixture which is free from excess hydrogen chloride may be distilled at reduced pressure in order to remove and isolate the unreacted triisobutylene isomers having a centrally located double bond. The triisobutylene hydrochloride of the isomers having a terminal double bond formed by the addition reaction are unstable to distillation and are readily decomposed by heating at atmospheric pressure in the distillation system. The products of the decomposition are hydrogen chloride and triisobutylene and the high boiling isomers having a terminally located double bond are recovered substantially free from the low boiling isomers having a centrally located double bond.

The separation of the isomers of triisobutylene may also be accomplished with the use of aqueous hydrogen chloride. Triisobutylene may be contacted with concentrated solutions of hydrogen chloride so that the reactive isomers are transformed into hydrochloride addition products which are separated by distillation at reduced pressure, thereby recovering the unreactive isomers of triisobutylene. The reactive isomers of triisobutylene are recovered from the hydrochlorides by heating to drive off the hydrogen chloride. Aids in speeding the reaction between aqueous hydrogen chloride and triisobutylene may be used, examples of which are wetting agents, emulsifying agents, or catalysts such as zinc chloride.

The dehydrohalogenation of the triisobutylene hydrochloride in the process for recovering the active isomer of triisobutylene may be accomplished with heat alone or it may be accelerated by the use of other agents such as $BaCl_2$, $NaCl$, $CaCl_2$, $CaO$, other alkalis, and substances known to catalyze the dehydrohalogenation of halides to olefins.

A continuous process for the separation of isomers of triisobutylene can be practiced by this invention whereby the olefin is contacted with hydrogen halide, preferably an excess, in a reactor which feeds directly to a fractionating still under reduced pressure, the pure low boiling unreactive isomers are removed overhead and the bottoms fed to a heating chamber to remove hydrogen chloride which is recycled to the fresh feed while the dehydrohalogenated product is fed to a fractionating still to obtain pure higher boiling reactive isomers of triisobutylene.

The triisobutylenes having a terminal double bond are valuable materials because they form corresponding hydrochlorides which may be used in various reactions such as alkylation, etherification, esterification and salt forming reactions. It is of considerable importance to separate the isomers having a double bond attached to the second carbon atom in the longest chain from those having a double bond attached to the fourth carbon atom in the longest chain because the isomers are of different reactivity and may be used separately to advantage in various reactions, such as alkylation, hydrogenation, sulfhydrylation, halogenation, etc. The isomers and their hydrogenation products have different octane numbers which make their separation important in the preparation of fuels.

*Example 1*

In a glass reactor with stirrer were placed 190 cc. (142.7 g. or 1.177 mols) of triisobutylene (B. P. 175–178° C.) and 570 cc. of concentrated hydrochloric acid. The mixture was stirred 24 hours. After settling, the layers were separated and the organic layer dried over anhydrous potassium carbonate and blown with carbon dioxide gas to remove any excess hydrogen chloride. The weight of the product was 132 g. which analyzed for 1.82% chlorine by the Parr bomb method. A charge of 127.9 g. of this reaction product was distilled from a Claisen flask at 20 mm. pressure:

| Fraction | P. B., °C/20 mm. | Bath Temp., °C. | Weight, grams | $N_D^{20}$ | Percent Cl by Parr Bomb |
|---|---|---|---|---|---|
| EA | 67–70 | 85 | 20 | 1.4308 | 1.55 |
| EB | 70–72.5 | 84 | 66.1 | 1.4312 | 1.12 |
| EC | 72.5–75 | 86 | 23.2 | 1.4316 | 1.46 |
| ED | 75–78.5 | 99 | 11.2 | 1.4332 | 2.69 |
| EE | Residue |  | 7.6 | 1.4503 | 15.16 |

A more careful fractionation of fractions EA, EB, EC, and ED produced the isomer of triisobutylene which did not add hydrogen chloride in a pure form.

*Example 2*

504 grams (3 mols) of triisobutylene were placed in a one quart glass pressure bottle and 48 grams of dry hydrogen chloride were absorbed by bubbling into the triisobutylene. The temperature of the reaction mixture was kept at 10° throughout the addition of the hydrogen chloride. After the hydrogen chloride had been added, the bottle was stoppered and allowed to stand for three days. The bottle was opened at room temperature and there was no pressure. Hydrogen chloride was again bubbled into the reaction mixture while the temperature was maintained at that of an ice bath, resulting in a weight increase of 2 grams, The bottle was stoppered and allowed to stand overnight. There was no pressure when the bottle was opened at room temperature. An additional weight increase of 2 grams was obtained after hydrogen chloride was again bubbled into the reaction mixture while the temperature was that of an ice bath. The bottle was stoppered and allowed to stand overnight. It was then opened at room temperature and there was found to be a slight pressure due to unreacted hydrogen chloride. The reaction mixture was decanted from a small amount of acid sludge and 25 grams of anhydrous potassium carbonate was added. A stream of nitrogen was passed through the reaction mixture to remove the excess hydrogen chloride. The reaction mixture was then filtered and distilled at 10 mm. from a Claisen flask:

| Fraction | B. P., °C./10 mm. | Bath Temp., °C. | Weight, grams | $N_D^{20}$ | Cu Wire Test for Cl |
|---|---|---|---|---|---|
| A | 53–63.5 | 80–91 | 257.0 | 1.4326 | + |
| B | 73–74 | 100–102 | 42.0 | 1.4336 | + |
| C |  | 102 | 1.0 | 1.4325 | + |
| D | residue |  | 199.7 | 1.4492 | [1] 11.65% Cl |

[1] Parr bomb.

A 100 g. charge of fraction A was fractionally distilled at 50 mm. pressure through a 12 x 440 mm. (I. D.) column packed with ⅛" glass helices:

| Fraction | B. P.,°C./50 mm. | Reflux Ratio | Weight, grams | $N_D^{20}$ | Cu Wire Test for Cl |
|---|---|---|---|---|---|
| AA | 75.5–82.5 | 86 | 0.5 | 1.4224 | + |
| AB | 82.5–86 | 40 | 1.3 | 1.4260 | + |
| AC | 86–89 | 40 | 2.8 | 1.4289 | − |
| AD | 89–89.3 | 35 | 5.7 | 1.4292 | − |
| AE | 89.3–89.3 | 36 | 5.0 | 1.4292 | − |
| AF | 89.3–89.5 | 10 | 9.3 | 1.4296 | − |
| AG | 89.5–89.5 | 10 | 8.0 | 1.4299 | − |
| AH | 89.5–89.5 | 10 | 13.1 | 1.4299 | − |
| AI | 89.5–89.5 | 11 | 14.2 | 1.4299 | − |
| AJ | 89.5–90.5 | 12 | 16.1 | 1.4301 | − |
| AK | 90.5–91.3 | 12 | 13.0 | 1.4319 | − |
| AL | residue |  | 6.0 | 1.4468 | weak |

Fraction D was heated at 100° C. for about 8 hours while bubbling nitrogen through the liquid to remove hydrogen chloride. It was then distilled through a short (4 inch) Vigreaux column:

| Fraction | B. P., °C./50mm. | Weight, grams | $N_D^{20}$ |
|---|---|---|---|
| BA | 104–108 | 10.2 | 1.4347 |
| BB | 108–110 | 36.4 | 1.4363 |
| BC | 110–116 | 9.3 | 1.4413 |
| BD | 116–135 | 6.4 | 1.4461 |
| BE | 135–146 | 12.2 | 1.4534 |
| BF | residue | 2.5 |  |

Fractions BA, BB, and BC were combined to make a charge of 54.2 g. which was fractionally distilled at 50 mm. pressure through the 12 x 440 mm. column packed with ⅛" glass helices:

| Fraction | B. P., °C./50 mm. | Reflux | Weight, grams | $N_D^{20}$ | Cu Wire Test for Cl |
|---|---|---|---|---|---|
| CA | 86–89 | 26 | 0.7 | 1.4285 | − |
| CB | 89.5 | 26 | 1.1 | 1.4299 | − |
| CC | 89.5–89.5 | 28 |  | 1.4300 | − |
| CD | 89.5–89.9 | 10 | 2.3 | 1.4299 | − |
| CE | 89.9–90 | 10 | 3.4 | 1.4306 | − |
| CF | 90–90.1 | 9 | 2.7 | 1.4308 | − |
| CG | 90.1–90.3 | 9 | 3.2 | 1.4310 | − |
| CH | 90.3–90.5 | 10 | 4.2 | 1.4312 | − |
| CI | 90.5–91.5 | 10 | 5.3 | 1.4315 | − |
| CJ | 91.5–92.5 | 10 | 2.5 | 1.4330 | − |
| CK | 92.5–96 | 10 | 6.1 | 1.4368 | − |
| CL | 96–97.6 | 9 | 9.3 | 1.4401 | − |
| CM | 97.6–90.2 | 10 | 6.4 | 1.4420 | + |
| CN | residue |  | 6.5 | 1.4556 | + |

A 100 g. charge of the original untreated triisobutylene was fractionally distilled at 50 mm. pressure through the same 12 x 440 column packed with ⅛" glass helices as used in above distillations:

| Fraction | B. P., °C./50 mm. | Reflux | Weight, Grams | $N_D^{20}$ |
|---|---|---|---|---|
| DA | 82–87 | 6 | 2.0 | 1.4245 |
| DB | 87–90 | 9 | 7.3 | 1.4294 |
| DC | 90–90 | 12 | 4.6 | 1.4301 |
| DD | 90–90 | 12 | 8.7 | 1.4303 |
| DE | 90–90.3 | 12 | 9.7 | 1.4308 |
| DF | 90.5–90.5 | 12 | 9.2 | 1.4308 |
| DG | 90.5–90.5 | 12 | 9.8 | 1.4310 |
| DH | 90.5–90.7 | 12 | 9.8 | 1.4310 |
| DI | 90.7–91.5 | 12 | 6.6 | 1.4321 |
| DJ | 91.5–92.5 | 8 | 6.4 | 1.4337 |
| DK | 92.5–95 | 5 | 4.5 | 1.4362 |
| DL | 95–97 | 5 | 5.0 | 1.4398 |
| DM | 97–102 | 8 | 3.5 | 1.4399 |
| DN | 102–110 | 9 | 4.7 | 1.4355 |
| DO | residue |  | 6.0 | 1.4561 |

Atmospheric boiling points for several of the above fractions were determined with a semimicro Cottrell apparatus (Willard and Crabtree, Ind. Eng. Chem., Anal. Ed., 8, 79 (1936)) using Anshutz thermometers calibrated by the Bureau of Standards:

| 5 cc. of Fraction AH | | 5 cc. of Fraction CH | | 4 cc. of Fraction CJ | |
|---|---|---|---|---|---|
| cc. off | B. P., °C./752.1 mm. | cc. off | B. P., °C./754.9 mm. | cc. off | B. P., °C./754.9 mm. |
| 0 | 176.5 | 0 | 177.7 | 0 | 179.5 |
| 0.5 | 176.9 | 0.5 | 178.0 | 0.5 | 179.5 |
| 1.0 | 176.9 | 1.0 | 178.1 | 1.0 | 179.7 |
| 1.5 | 177.0 | 1.5 | 178.3 | 1.5 | 179.8 |
| 2.0 | 177.1 | 2.0 | 178.3 | 2.0 | 179.8 |
| 2.5 | 177.1 | 2.5 | 178.3 | 2.5 | 179.9 |
| 3.0 | 177.1 | 3.0 | 178.4 | 3.0 | 180.1 |
| 3.5 | 177.1 | 3.5 | 178.4 |  |  |
|  |  | 4.0 | 178.5 |  |  |

| 5 cc. of Fraction CL | | 5 cc. of Fraction DD | | 5 cc. of Fraction DL | |
|---|---|---|---|---|---|
| cc. off | B. P., °C./754.9 mm. | cc. off | B. P., °C./763.7 mm. | cc. off | B. P., °C./764.2 mm. |
| 0 | 187.1 | 0 | 177.8 | 0 | 185.1 |
| 0.5 | 187.2 | 0.5 | 178.0 | 0.5 | 185.3 |
| 1.0 | 187.3 | 1.0 | 178.1 | 1.0 | 185.5 |
| 1.5 | 187.4 | 1.5 | 178.1 | 1.5 | 185.7 |
| 2.0 | 187.4 | 2.0 | 178.2 | 2.0 | 185.8 |
| 2.5 | 187.7 | 2.5 | 178.3 | 2.5 | 185.9 |
| 3.0 | 187.9 | 3.0 | 178.4 | 3.0 | 186.1 |
| 3.5 | 187.9 | 3.5 | 178.5 | 3.5 | 186.3 |
| 4.0 | 188.3 | 4.0 | 178.6 | 4.0 | 186.9 |

It is understood that this invention is not to be limited to the foregoing material in the nature of examples but is to be considered broadly as defined by the breadth of the appended claims.

What is claimed and sought to be secured by Letters Patent is:

1. A process for the separation of the isomers of triisobutylene having a double bond attached to the second carbon atom in the longest chain from the isomers of triisobutylene having a double bond attached to the fourth carbon atom in the longest chain which comprises adding hydrogen chloride to a mixture of said isomers whereby the hydrogen chloride reacts with the isomers having a double bond attached to the second carbon atom in the longest chain to form triisobutylene chlorides, distilling the reaction mixture to separate the unreacted isomers of triisobutylene containing the double bond attached to the fourth carbon atom in the longest chain, dehydrochlorinating the triisobutylene chlorides and regenerating the triisobutylene isomers containing the double bond attached to the second carbon atom in the longest chain.

2. A process according to claim 1 in which the reaction between the isomers of triisobutylene having a double bond attached to the second carbon atom in the longest chain and hydrogen chloride is carried out at a temperature within the range of 0° C. to 50° C.

3. A process according to claim 1 in which the distillation to separate the unreacted isomers is carried out under reduced pressure.

4. A process according to claim 1 in which the dehydrochlorination is accomplished by the application of heat.

5. A process according to claim 1 in which the dehydrochlorination is accomplished by the action of an alkali.

6. A process for the separation of the isomers of triisobutylene having a double bond attached to the second carbon atom in the longest chain from the isomers of triisobutylene having a double bond attached to the fourth carbon atom in the longest chain which comprises adding aqueous hydrogen chloride to a mixture of said isomers whereby the aqueous hydrogen chloride reacts with the isomers having a double bond attached to the second carbon atom in the longest chain to form triisobutylene chlorides, distilling the reaction mixture to separate the unreacted isomers of triisobutylene containing the double bond attached to the fourth carbon atom in the longest chain, dehydrochlorinating the triisobutylene chlorides and regenerating the triisobutylene isomers containing the double bond attached to the second carbon atom in the longest chain.

7. A process according to claim 6 in which the reaction between the isomers of triisobutylene having a double bond attached to the second carbon atom in the longest chain and aqueous hydrogen chloride is carried out at a temperature within the range of 0° C. to 50° C.

8. A process according to claim 6 in which the distillation to separate the unreacted isomers is carried out under reduced pressure.

9. A process according to claim 6 in which the dehydrochlorination is accomplished by the application of heat.

10. A process according to claim 6 in which the dehydrochlorination is accomplished by the action of an alkali.

11. A process for the separation of the isomers of triisobutylene having a double bond attached to the second carbon atom in the longest chain from the isomers of triisobutylene having a double bond attached to the fourth carbon atom in the longest chain which comprises adding anhydrous hydrogen chloride to a mixture of said isomers whereby the anhydrous hydrogen chloride reacts with the isomers having a double bond attached to the second carbon atom in the longest chain to form triisobutylene chlorides, distilling the reaction mixture to separate the unreacted isomers of triisobutylene containing the double bond attached to the fourth carbon atom in the longest chain, dehydrochlorinating the triisobutylene chlorides and regenerating the triisobutylene isomers containing the double bond attached to the second carbon atom in the longest chain.

12. A process according to claim 11 in which the reaction between the isomers of triisobutylene having a double bond attached to the second carbon atom in the longest chain and anhydrous hydrogen chloride is carried out at a temperature within the range of 0° C. to 50° C.

13. A process according to claim 11 in which the distillation to separate the unreacted isomers is carried out under reduced pressure.

14. A process according to claim 11 in which the dehydrochlorination is accomplished by the application of heat.

15. A process according to claim 11 in which the dehydrochlorination is accomplished by the action of an alkali.

LAWRENCE T. EBY.

REFERENCES CITED

The following references are of record in the file of this patent:

UNITED STATES PATENTS

| Number | Name | Date |
| --- | --- | --- |
| 1,087,961 | Masland | Feb. 24, 1914 |
| 1,384,423 | Bielouss | July 12, 1921 |
| 2,368,446 | Buc | Jan. 30, 1945 |

OTHER REFERENCES

Butlerow, Berichte, vol. 12, 1482–3.
Waterman et al., Rec. des Trav. Chim. vol. 53, 1151–8 (1934).